US006854154B2

(12) United States Patent
Masuda

(10) Patent No.: US 6,854,154 B2
(45) Date of Patent: Feb. 15, 2005

(54) WIPER ASSEMBLY WITH MOVABLE WIPER MOTOR SUPPORT

(75) Inventor: Tadashi Masuda, Tokyo-To (JP)

(73) Assignee: Fuji Jukogyo Kabushiki Kaisha (JP)

( * ) Notice: Subject to any disclaimer, the term of this patent is extended or adjusted under 35 U.S.C. 154(b) by 193 days.

(21) Appl. No.: 10/028,713

(22) Filed: Dec. 28, 2001

(65) Prior Publication Data

US 2002/0083544 A1 Jul. 4, 2002

(30) Foreign Application Priority Data

Dec. 28, 2000 (JP) ....................................... 2000-402377

(51) Int. Cl.$^{7}$ ............................... B60S 1/34; B60S 1/06

(52) U.S. Cl. ................ 15/250.31; 15/250.3; 296/96.17; 403/2; 403/DIG. 3; 248/900

(58) Field of Search ........................... 15/250.3, 250.31; 296/96.17, 189, 96.15, 188; 403/DIG. 3, 24, 2; 248/900

(56) References Cited

U.S. PATENT DOCUMENTS 5,873,280 A * 2/1999 Kanazawa ..................... 74/42
5,960,512 A 10/1999 Schael et al.
6,193,304 B1 * 2/2001 Takahashi et al. .......... 296/192
6,216,309 B1 * 4/2001 Goto et al. .............. 15/250.31
6,237,185 B1 * 5/2001 Goto et al. .............. 15/250.31
6,505,376 B1 1/2003 Kagawa
6,532,616 B1 * 3/2003 Eustache ................. 15/250.31
2001/0011831 A1 8/2001 Ohashi et al.

FOREIGN PATENT DOCUMENTS

| DE | 1 983 3488 | 1/1999 |
|---|---|---|
| EP | 0 739 792 | 10/1996 |
| EP | 1 122 137 | 8/2001 |
| JP | 11-34808 | 2/1999 |

* cited by examiner

*Primary Examiner*—Gary K. Graham
(74) *Attorney, Agent, or Firm*—Smith, Gambrell & Russell, LLP

(57) ABSTRACT

A motor bracket is attached at one end of a vehicle body so as to be able to slide, and is fixed at the other end to the vehicle body. And weak points are provided in the vicinity of a motor bracket fixing section. Weak points are also provided in the vicinity of a first fixing section of a first pivot holder. On the other hand, weak points are also provided in the vicinity of a second fixing section of a second pivot holder. Since the motor bracket slides and becomes detachable if the weak points are ruptured, it is possible to absorb an impact at the wiper motor. Since the first and second pivot holders are also detached if the weak points and weak points are ruptured, it is possible to improve the overall impact absorbing performance of the vehicle wiper assembly.

15 Claims, 5 Drawing Sheets

100
101
101
102
103
105
15
151
152
153
15a
15b
15c
15c
C
16
13
170
170
170
170
170
13a
13a
13a
13a
III
III
17
17a
17b
17c
17c
17d
171
172
173
14
14a
14b
14c
14c
141
142
143
102
103
104
V
V

WIPER ASSEMBLY WITH MOVABLE WIPER MOTOR SUPPORT

BACKGROUND OF THE INVENTION

1. Field of the Invention

The present invention relates to a vehicle wiper assembly.

2. Discussion of the Related Art

It has always been necessary, in a vehicle wiper assembly, to have technology for absorbing impacts from the outside. As one example of this, there is the technology disclosed in Japanese Patent Laid-open No. Hei. 11-34808. This technology is for absorbing the impacts from outside acting on a base end section of a wiper arm by rupturing or dropping off of a pivoted holder section.

However, with the above described technology of the related art, only a pivoted holder section is made to drop off, and a wiper motor part for driving the wiper arm remains connected to the vehicle body. The wiper motor part is heavy and so has high rigidity, and in the event that external force from outside the vehicle is applied to the wiper motor part, it is not possible to absorb the impact. Particularly to a front wiper, as the wiper assembly thereof is housed in a bulkhead having a closed sectional form extending in a widthwise direction of the vehicle along a lower edge section of a front windshield, it is also common conventional for a wiper motor to be housed in the bulkhead. And further, for this type of structure, as a gap between the wiper motor and the bulkhead is reduced, there causing a problem that it is difficult to absorb further impact.

The purpose of the present invention is to enable sufficient absorption of the impact even when an external force from outside the vehicle is applied to the wiper motor part where there is a small gap between the wiper motor part of a wiper assembly and the bulkhead having high rigidity. The purpose of the present invention is also to improve an impact absorbing capability of the overall wiper assembly by causing the wiper assembly itself to also completely drop off due to external force from outside the vehicle, in addition to the impact absorption of the external force to the wiper motor section.

SUMMARY OF THE INVENTION

In order to solve the problems described above, a first aspect of the present invention, as shown in FIG. 1, is a vehicle wiper assembly 1 provided with a swingable wiper arm 12 having a wiper blade 11 for wiping a windshield 2 attached to a tip end, and a wiper motor 13 for driving the wiper arm 12, wherein the wiper motor 13 is attached to move the wiper 1 to the inside of the vehicle under an external force to the vehicle body.

According to the first aspect of the present invention, since the wiper motor moves to the inside of the vehicle under the external force, the impact from outside can be absorbed by the wiper motor part.

A second aspect of the present invention, as shown in FIG. 2, is provided with a support member 17 for attaching the wiper motor 13, and the support member 17 is swingably attached at one end to the vehicle body and fixed at the other end, and is also provided with a weak point 17*c* having low rupture strength in the vicinity of a vehicle body fixing section 17*a*.

According to the second aspect of the present invention, since the wiper motor support member has the weak point with low rupture strength in the vicinity of the vehicle body fixing section, the weak point is ruptured if an external force is applied to the wiper motor section. And it is possible to absorb the impact by sliding the wiper motor support member to the inside of the vehicle.

A third aspect of the present invention is to provide a support member to which the wiper motor is attached, and the support member has both ends fixed to the vehicle body, and has the weak point of the low rupture strength provided in the vicinity of a vehicle fixing section.

According to the third aspect of the present invention, since the wiper motor support member has the weak points of the low rupture strength in the vicinity of the vehicle fixing section at the both ends, it is possible to absorb the impact through rupturing of the weak point by the external force and by detaching the wiper motor support member even if both ends of the wiper motor support member are fixed to the vehicle body.

A fourth aspect of the present invention, as shown for example in FIG. 2, has weak points 14*c* and 15*c* having low rupture strength provided in the vicinity of vehicle fixing sections 14*a* and 15*a* of pivot holders 14, 15 for rotatably supporting pivot shafts 104 and 105 to attach base end sections of wiper arms 12, 12.

According to the fourth aspect of the present invention, since the pivot holders for the wiper arm shafts also have the weak points of the low rupture strength in the vicinity of the vehicle fixing sections, if the external force is applied to the pivot holder sections, the weak points of the pivot holders are ruptured, the pivot holder sections become detached, and the entire wiper assembly is detached. Accordingly, it is possible to improve the impact absorbing performance of the entire wiper assembly.

DESCRIPTION OF THE PREFERRED EMBODIMENTS

Embodiments of the present invention will be described in detail in the following with reference to drawings.

Figure 1:
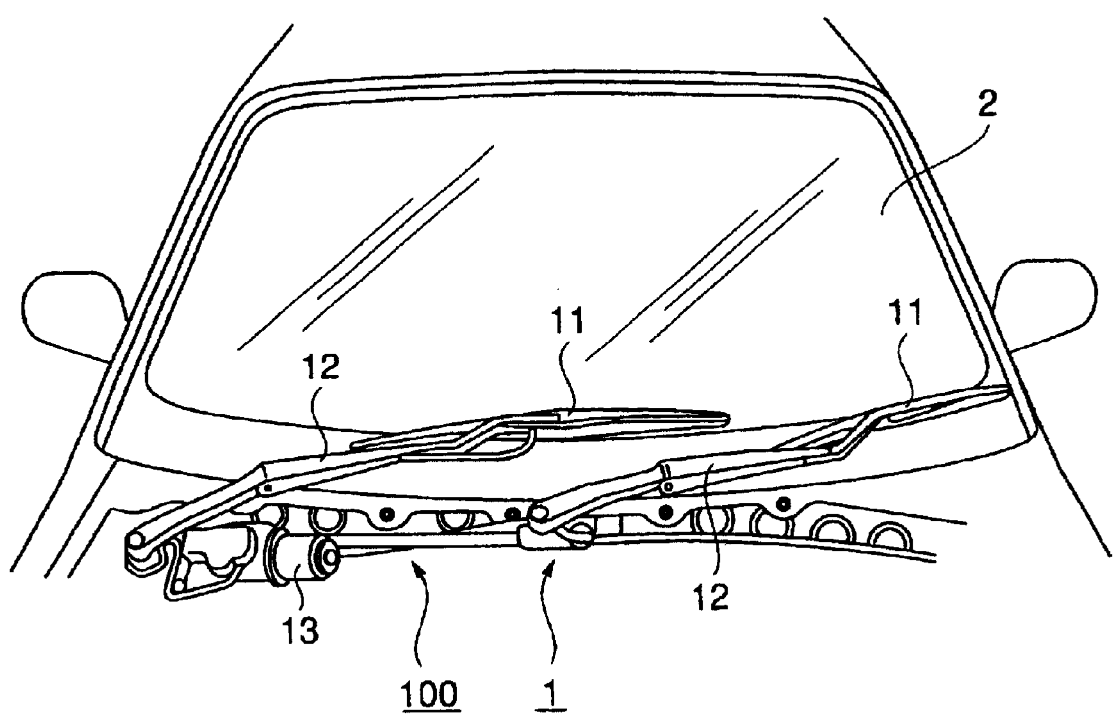
FIG. 1 shows a first embodiment of a vehicle wiper assembly of the present invention.

In the first embodiment, a wiper assembly 1, as shown in FIG. 1, is applied to a tandem type where a pair of left and right wiper arms 12 with each wiper blade 11 swing together for wiping a windshield 2 attached at tip ends. The wiper assembly 1 causes each wiper arm 12 to swing by conveying motive power of a wiper motor 13 through a link mechanism 100.

Figure 2:
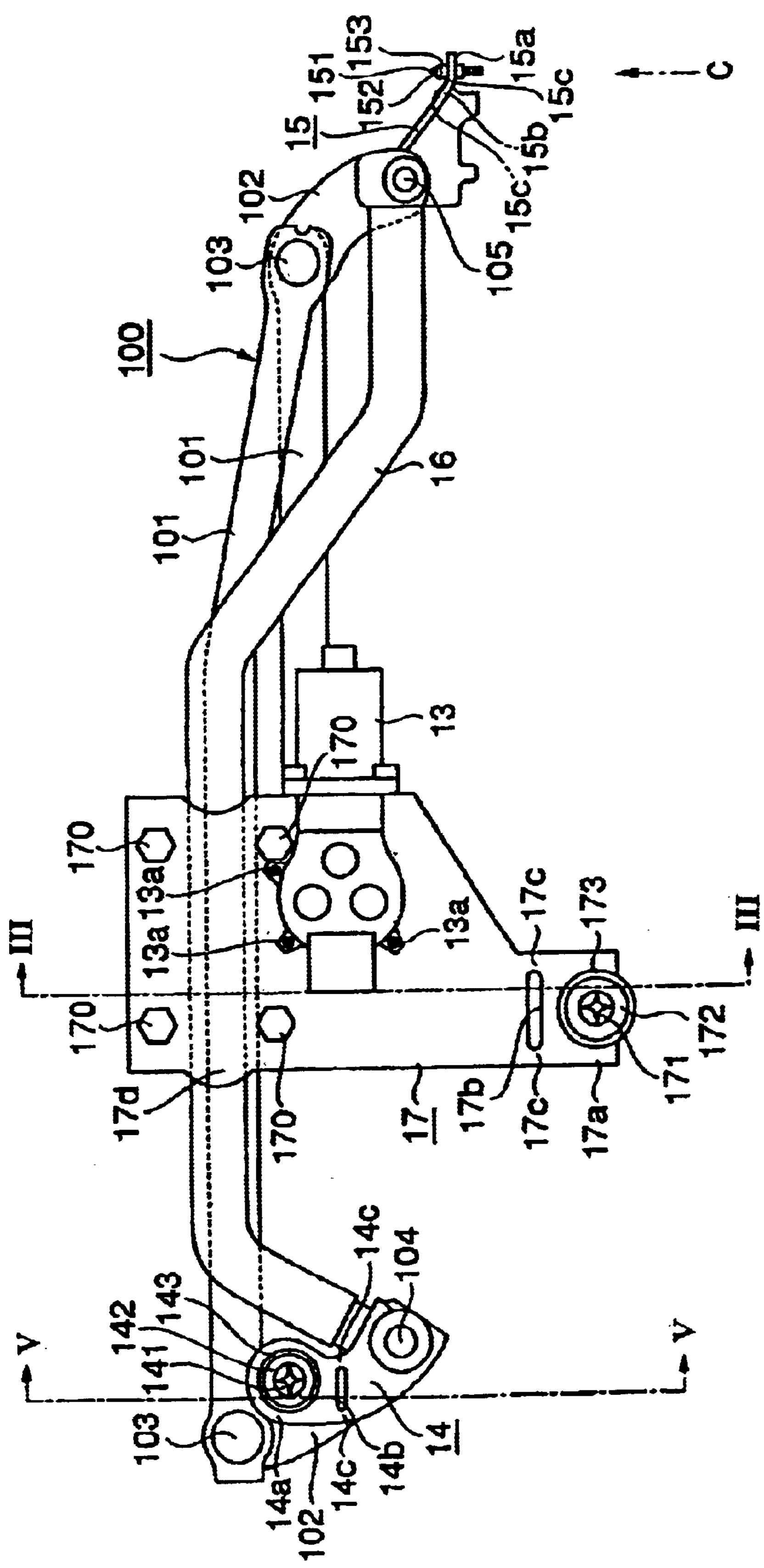
FIG. 2 is a schematic front elevation view of the vehicle wiper.

A link mechanism 100, as shown in FIG. 2, comprises a rod 101 for conveying a motive power, a crank members 102 for converting the motive power, and a link ball joint 103 for connecting the rod 101 and the crank member 102. A first pivot shaft 104 and a second pivot shaft 105 are connected to the crank members 102, 102. The first pivot shaft 104 and the second pivot shaft 105 are rotatably attached to a first pivot holder 14 and a second pivot holder 15, respectively. The first pivot holder 14 and the second pivot holder 15 are respectively connected to both ends of a pipe 16 bent for passing over the wiper motor 13. A motor bracket (support member) 17 is attached to an upwardly bent section of the pipe 16.

Next, the motor bracket 17, the first pivot holder 14 and the second pivot holder 15 will be described in detail thereafter.

First of all, the wiper motor 13 is attached to a central section of the motor bracket 17 by using screws 13*a*, 13*a*, 13*a*. A motor bracket fixing section 17*a* for fixing to the vehicle body using a screw 171, a washer 172 and a rubber 173 is provided at a lower end of the motor bracket 17. An elliptical hole 17*b* is then formed between the wiper motor 13 and the motor bracket fixing section 17*a*. Both side sections of the elliptical hole 17*b* constitute low rupture strength weak points 17*c*, 17*c*. Another end of the motor bracket 17 constitutes a bearing section 17*d* for the pipe 16, and is rotatably attached to the pipe 16 by using nuts and bolts 170, 170, 170, 170.

Also, a first fixing section 14*a* for fixing to the vehicle body above the first pivot holder 14 by using a screw 141, a washer 142 and a rubber 143 is provided in the first pivot holder 14. An elliptical hole 14*b* is then formed between the first fixing section 14*a* and the first pivot shaft 104. Both side sections of this elliptical hole 14*b* constitute low rupture strength weak points 14*c*, 14*c*. Similarly, a second fixing section 15 for fixing to the vehicle body by using a screw 151, a washer 152 and rubber 153 is provided on the second pivot holder 15, to the left side thereof. An elliptical hole 15*b* is formed between the second fixing section 15*a* and the second pivot shaft 105. The two sides of the elliptical hole 15*b* constitute low rupture strength weak points 15*c*, 15*c*.

Next, an operation will be described when an external force is applied to sections including the vehicle wiper assembly 1.

Figure 3:
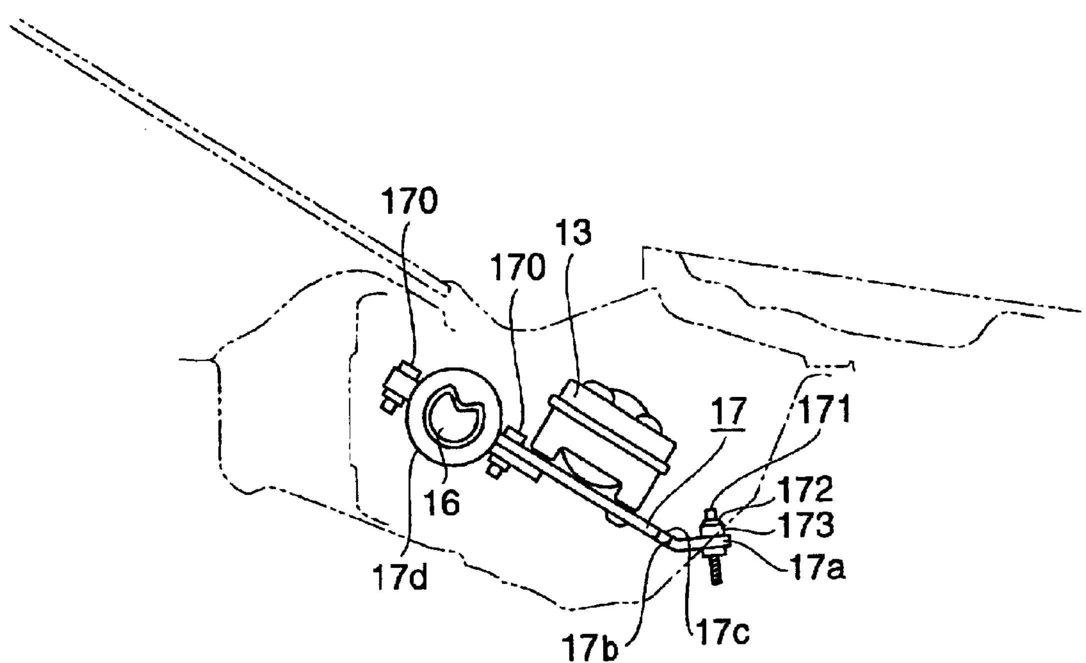
FIG. 3 is a cross sectional view taken along line III—III in FIG. 2.
Figure 4:
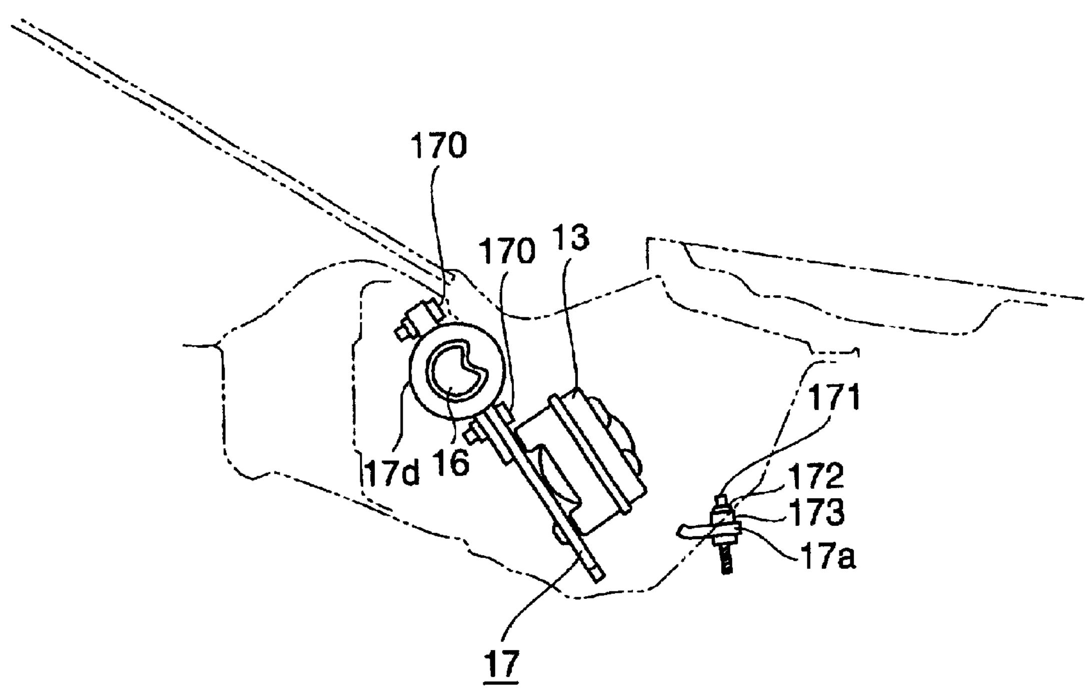
FIG. 4 is a cross sectional drawing showing a motor bracket of FIG. 3 after rupture.

First, when the external force is applied to the wiper motor 13 part, as shown in FIGS. 3 and 4, due to the fact that the weak points 17*c*, 17*c* of the motor bracket 17 are ruptured, the motor bracket 17 rotates towards the inside direction of the vehicle body and is detached. Also, the wiper motor 13 is detached due to the fact that it rotates inside a narrow space formed by a vehicle body panel shown by the dotted line in the drawing.

Figure 5:
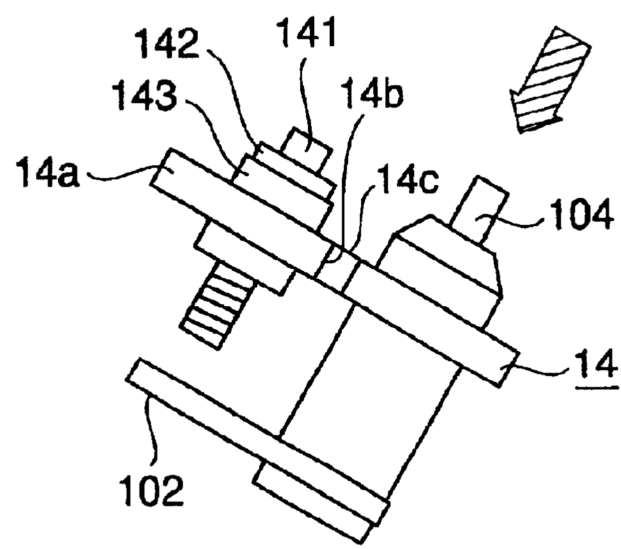
FIG. 5 is the cross sectional view taken along line V—V in FIG. 2.
Figure 6:
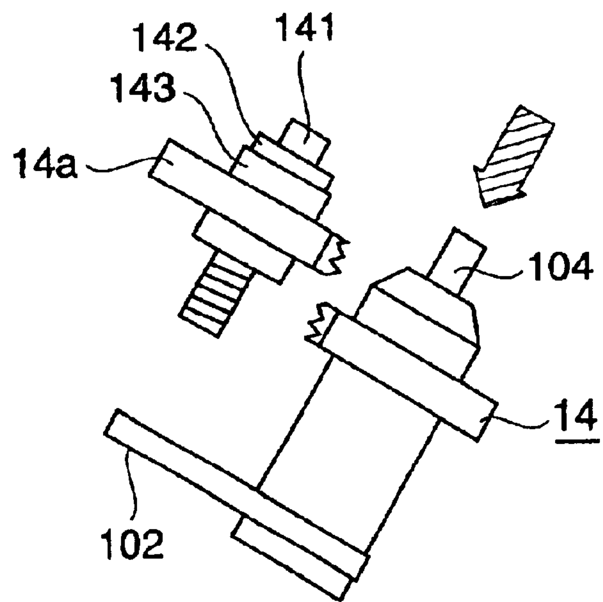
FIG. 6 is the cross sectional drawing showing a first pivot holder of FIG. 5 after the rupture.
Figure 7:
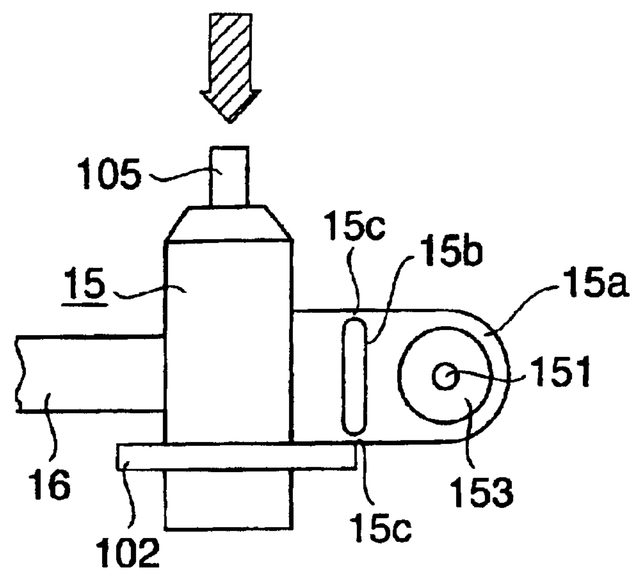
FIG. 7 is a perspective view in the direction of arrow C in FIG. 2.
Figure 8:
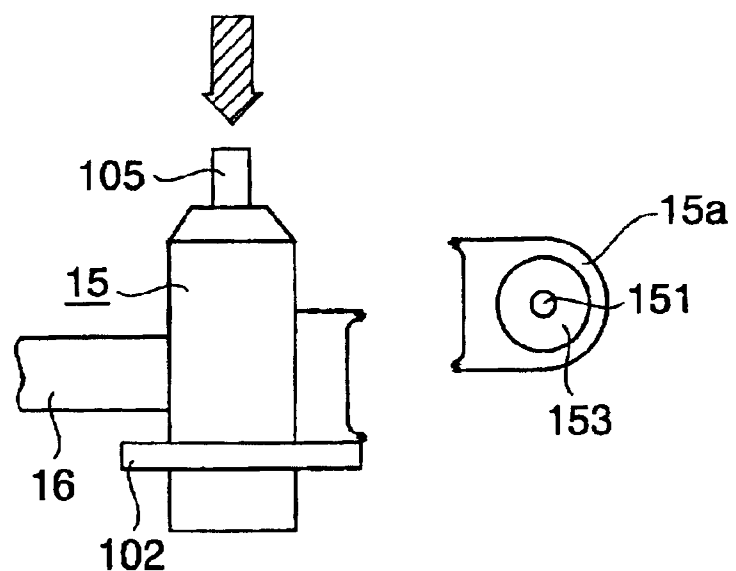
FIG. 8 is a perspective view showing a second pivot holder of FIG. 7 after the rupture.

Also, when the external force is applied to the first pivot holder 14, as shown in FIGS. 5 and 6, the first pivot holder 14 is detached by moving towards the inside direction of the vehicle due to the fact that the weak points 14*c*, 14*c* of the first pivot holder 14 are ruptured. On the other hand, when the external force is similarly applied to the second pivot holder 15, as shown in FIGS. 7 and 8, the second pivot holder 15 is detached by moving towards the inside direction of the vehicle due to the fact that the weak points 15*c*, 15*c* of the second pivot holder 15 are ruptured.

Accordingly, with the embodiment described above, if the external force is applied to the wiper motor 13, since the weak points 17*c*, 17*c* of the motor bracket 17 are ruptured and the motor bracket 17 is detached by rotating towards the inside direction of the vehicle, it is possible to absorb the impact at the wiper motor 13.

Due to the fact that the first pivot holder 14 and the second pivot holder 15 are also detached as well as the motor bracket 17, the vehicle wiper assembly 1 is completely detached by an external impact and it is possible to improve the overall impact absorbing performance of the vehicle wiper assembly 1.

In the embodiment described above, the weak points are formed by the elliptical holes, but the present invention is not thus limited, and it is possible to have the weak points formed as slots cut in from the sideward direction, or to have low rupture strength weak points formed by reducing the plate thickness.

It is also possible to have a structure where both ends of the motor bracket are fixed to the vehicle body, with the low rupture strength weak points provided in the vicinity of the vehicle body fixing sections, so that the motor bracket is detached by the external force.

While the presently preffered embodiments of the present invention have been shown and described, it is to be understood that these disclosures are for the purpose of illustration and that various changes and modifications may be made without departing from the scope of the invention as set forth in the appended claims.

What is claimed is:

1. A vehicle wiper assembly having a swingable wiper arm provided in the vicinity of a windshield and a wiper blade attached to a tip end of said wiper arm for wiping said windshield, comprising:

- a wiper motor for driving said wiper arm, said wiper motor being attached to a vehicle body via a first fixing section so as to move inside the vehicle body by an external force; and
- a support member for supporting said wiper motor, having a first end and an opposite second end, the support member swingably attached to the vehicle body at the first end and fixed to the vehicle body at the second end, the first fixing section being located at the second end, and
- a first weak section having low rupture strength provided between said wiper motor and said first fixing section.

2. The vehicle wiper assembly according to claim 1, further comprising:

- a wiper arm support member for supporting said wiper arm, having a first end and an opposing second end, the wiper arm support member fixed to the vehicle body at the first end of said wiper arm support member via a second fixing section, said wiper arm being attached to the wiper arm support member at the second end of said wiper arm support member, and
- a second weak section having low rupture strength provided between said second fixing section and the second end of said wiper arm support member.

3. The vehicle wiper assembly according to claim 2, wherein said second weak section having low rupture strength is provided in the vicinity of said second fixing section of a pivot holder for rotatably supporting a pivot shaft for attaching a base end section of the wiper arm.

4. A vehicle wiper assembly having a first swingable wiper arm and a second swingable wiper arm provided in the vicinity of a windshield and a wiper blade attached to a tip end of each wiper arm for wiping said windshield comprising:

- a wiper motor for driving said first and second wiper arms, said wiper motor being attached to a vehicle body via a first fixing section so as to move inside the vehicle body by an external force;

a support member for supporting said wiper motor, having a first end and an opposing second end, the support member being swingably attached to the vehicle body at the first end and fixed to the vehicle body at the second end, the first fixing section being located at the second end, and a first weak section having low rupture strength provided between said wiper motor and said first fixing section.

5. A vehicle wiper assembly having a first swingable wiper arm and a second swingable wiper arm provided in the vicinity of a windshield and a wiper blade attached to a tip end of each wiper arm for wiping said windshield comprising:

a wiper motor for driving said first and second wiper arms, said wiper motor being attached to a vehicle body via a first fixing section so as to move inside the vehicle body by an external force;

a first weak section having low rupture strength provided between said wiper motor and said first fixing section;

a first support member for supporting said first wiper arm, having a first end and an opposing second end, the first support member fixed to the vehicle body at the first end via a second fixing section, said first wiper arm being attached to the first support member at the second end;

a second weak section having low rupture strength provided between said second fixing section and said second end;

a second support member for supporting said second wiper arm, having a third end and an opposing fourth end, the second support member fixed to the vehicle body at the third end via a third fixing section, said second wiper arm being attached to the second support member at the fourth end; and a third weak section having low rupture strength provided between said third fixing section and said fourth end.

6. The vehicle wiper assembly according to claim 5, wherein said second weak section having low rupture strength is provided in the vicinity of said second fixing section of a pivot holder for rotatably supporting a pivot shaft for attaching a base end section of the first wiper arm, and said third weak section having low rupture strength is provided in the vicinity of said third fixing section of a pivot holder for rotatably supporting a pivot shaft for attaching a base end section of the second wiper arm.

7. A vehicle wiper assembly, comprising:

a wiper motor;

a bracket device supporting said wiper motor at a motor support section of said bracket device, said bracket device further including a vehicle body fixing section spaced from said motor support section along a length of said bracket device, said bracket device further including a first weak section having a low rupture strength and said first weak section being positioned between said vehicle body fixing section and said motor support section relative to a length of said bracket device such that said wiper motor is free to move further inside the vehicle upon an external force rupturing said first weak section;

a first pivot shaft for supporting a first wiper blade and a second pivot shaft for supporting a second wiper blade;

a first pivot holder and a second pivot holder each having a vehicle attachment section and each having a pivot shaft holder section for respective holding of said first and second pivot shafts; and a pipe secured at a first end to said first pivot holder and at a second end to said second pivot holder, and said bracket device having a pipe connection section which is connected to said pipe.

8. The vehicle wiper assembly of claim 7, wherein said motor support section is positioned between said pipe connection section and said first weak section relative to the length of said bracket device.

9. The vehicle wiper assembly of claim 7 wherein said vehicle body fixing section of said bracket includes a screw reception area.

10. The vehicle wiper assembly of claim 7 wherein the vehicle attachment section of said first pivot holder includes a second weak section of said vehicle wiper assembly such that said first pivot holder is free to break away from a connection state with the vehicle upon an external force rupturing said second weak section.

11. The vehicle wiper assembly of claim 10 wherein the vehicle attachment section of said second pivot holder includes a third weak section of said vehicle wiper assembly such that said second pivot holder is free to break away from a connection state with the vehicle upon an external force rupturing said third weak section.

12. The vehicle wiper assembly of claim 11 wherein said first, second and third weak sections are designed to all break away upon an external force application whereby said vehicle wiper assembly as a whole is detachable from said vehicle.

13. The vehicle wiper assembly of claim 12 wherein said first, second and third weak sections each include elongated break away slots.

14. The vehicle wiper assembly of claim 7 wherein the pipe connection section of said bracket device includes a bearing section that extends around said pipe and is rotatably attached to said pipe.

15. The vehicle wiper assembly of claim 7 further comprising a link assembly extending between said first and second pivot holders for rotation of pivot shafts pivotably supported by said pivot holders.

* * * * *